United States Patent
Mol et al.

(10) Patent No.: US 9,194,883 B2
(45) Date of Patent: Nov. 24, 2015

(54) ARRANGEMENT OF PIEZO-SENSORS IN ACCELEROMETER

(75) Inventors: Hendrik Anne Mol, Sleeuwijk (NL); Ludovicus Gommers, Sprundel (NL)

(73) Assignee: AKTIEBOLAGET SKF, Gothenburg (SE)

( * ) Notice: Subject to any disclaimer, the term of this patent is extended or adjusted under 35 U.S.C. 154(b) by 372 days.

(21) Appl. No.: 13/576,060

(22) PCT Filed: Feb. 2, 2010

(86) PCT No.: PCT/EP2010/000599
§ 371 (c)(1),
(2), (4) Date: Oct. 29, 2012

(87) PCT Pub. No.: WO2011/095180
PCT Pub. Date: Aug. 11, 2011

(65) Prior Publication Data
US 2013/0055814 A1    Mar. 7, 2013

(51) Int. Cl.
*G01P 15/09* (2006.01)
*G01P 15/18* (2013.01)

(52) U.S. Cl.
CPC ............... *G01P 15/09* (2013.01); *G01P 15/18* (2013.01); *Y10T 29/42* (2015.01)

(58) Field of Classification Search
CPC . G01P 15/0922; G01P 15/0907; G01P 15/18; H03H 3/02
USPC ....................................................... 73/514.34
See application file for complete search history.

(56) References Cited

U.S. PATENT DOCUMENTS

| 2003/0167844 A1* | 9/2003 | Tabota ....................... 73/514.34 |
| 2005/0284240 A1* | 12/2005 | Nishihara et al. ............ 73/865.3 |
| 2010/0192662 A1* | 8/2010 | Yanni .............................. 73/1.38 |
| 2011/0037457 A1* | 2/2011 | Chuang et al. ................ 324/120 |

FOREIGN PATENT DOCUMENTS

JP        63107215 A    5/1988

OTHER PUBLICATIONS

Crescini D; Marioli D; Sardini E; Taroni A Large Bandwidth and Thermal Compensated Piezoelectric Thick-Film Acceleration Transducer XP004227464 vol. 87, Nr:3, pp. 131-138; Jan. 5, 2001 Sensors and Actuators A, 20010105 Elsevier Sequoia S.A., Lausanne, CH—ISSN 0924-4247.

* cited by examiner

*Primary Examiner* — Hezron E Williams
*Assistant Examiner* — Tarun Sinha
(74) *Attorney, Agent, or Firm* — Bryan Peckjian; SKF USA Inc. Patent Dept.

(57) ABSTRACT

An accelerometer (102) senses acceleration in a specific direction through the voltages produced by multiple piezoelectric sensors (114, 302, 304) electrically arranged in parallel in response to the acceleration. The main axes of sensitivity of the piezoelectric sensors are aligned and point in the same direction. The parallel arrangement enables to control the thermal noise level of the output signal of the accelerometer that originates in a bias resistor (116) connected in parallel to the parallel arrangement of the piezoelectric sensors.

13 Claims, 6 Drawing Sheets

ARRANGEMENT OF PIEZO-SENSORS IN ACCELEROMETER

CROSS-REFERENCE

This application is the US National Stage of International Application No. PCT/EP2010/000599 filed on Feb. 2, 2010, the contents of which are herein incorporated by reference in entirety.

FIELD OF THE INVENTION

The invention relates to an apparatus comprising a physical component subjected to acceleration in operational use of the apparatus; and an accelerometer configured for supplying a signal representative of the acceleration. The invention further relates to a physical component configured for use in an apparatus and for being subjected to acceleration in operational use of the apparatus, wherein the physical component accommodates an accelerometer, to an accelerometer and to a method of manufacturing an accelerometer.

BACKGROUND ART

Accelerometers are well known devices that are configured for measuring the acceleration or deceleration of a physical object, to which they are attached, relative to freefall. The operation of a specific type of accelerometer is based on the workings of a piezoelectric sensor. The acceleration or deceleration of the physical object causes a mechanical stress to be applied to a piezoelectric element of the piezoelectric sensor. The mechanical stress in turn induces a voltage across the piezoelectric element. The induced voltage is used as a signal, representative of the acceleration or of the deceleration, and can be used for control of, e.g., an actuator in dependence on the acceleration or deceleration sensed.

SUMMARY OF THE INVENTION

Consider an accelerometer, whose operation is based on sensing the voltage induced in a piezoelectric element as a result of acceleration. A typical configuration of an electronic circuit for use in such accelerometer uses a differential amplifier having a resistive feedback-path between an output of the amplifier and an inverting input of the amplifier, and having a non-inverting input of the amplifier connected to signal-ground via a parallel arrangement of a piezoelectric element and a bias resistor.

A piezoelectric sensor can be modelled as a voltage-source in series with a capacitance of magnitude $C_p$. The voltage supplied by the voltage-source is representative of the sensed rate of change of the velocity. The low-frequency limit of the flat part of the frequency-response characteristic of the sensor is determined by the value $C_p$ of the capacitance and a resistance value $R_b$ of the bias resistor. The cut-off frequency (or: the low-frequency limit, or: the 3 dB cut-off frequency) has a magnitude equal to $1/(2\pi C_p R_b)$. The actual bias resistor is not an ideal resistor, in the sense that the bias resistor introduces a noise voltage as a result of thermal agitation of the charge carriers. The noise voltage is amplified by the amplifier and affects the output voltage of the amplifier. For a given frequency bandwidth $\Delta f$, wherein one wants to consider the effects of the thermal noise, the actual bias resistor can be modelled as a series arrangement of a noise voltage-source that supplies a mean noise voltage equal to the square root of $4 k_B T R_b \Delta f$, and an ideal bias resistor having the resistance value $R_b$. One way of reducing the thermal noise is to decrease the resistance value $R_b$. This, however, has the undesired effect of increasing the cut-off frequency in above typical configuration.

The inventor therefore proposes the following. If the resistance value $R_b$ is changed by a factor X then the noise level changes by a factor X and the cut-off frequency changes by a factor 1/X. If the capacitance $C_p$ of the piezoelectric sensor is changed by a factor 1/X, then the level of the cut-off frequency can be maintained. Typically, piezoelectric sensors are marketed as units, whose electrical properties cannot be adjusted. The capacitance value at the non-inverting input of the amplifier, as a result of the presence of the piezoelectric sensor, can nevertheless be adjusted by using two or more piezoelectric sensors at the non-inverting input. For example, reducing the resistance value $R_b$ by a factor of ½, reduces the thermal noise by a factor of (½). In order to maintain the level of the cut-off frequency, two piezoelectric sensors can then be connected in parallel with each other and with the bias resistor.

More specifically, an embodiment of the invention relates to an apparatus comprising a physical component subjected to acceleration in operational use of the apparatus, and an accelerometer configured for supplying a signal representative of the acceleration. The accelerometer comprises an electronic circuit with a voltage amplifier having a first input, a second input, and an output, multiple piezoelectric sensors that are substantially identical, and a bias resistor connected between the input and signal-ground. The electronic circuit is free of a feedback connection between the first input and the output. The piezoelectric sensors are electrically connected to the first input without a switch therebetween such that constant electrical communication is maintained between the piezoelectric sensors and the first input. Each respective one of the multiple piezoelectric sensors has a respective first electrode, a respective second electrode, and a respective first axis of main sensitivity. The multiple piezoelectric sensors are mounted with their first axes aligned with each other. Each respective one of the multiple piezoelectric sensors is mounted for generating a respective positive voltage at the respective first electrode and a respective negative voltage at the respective second electrode in response to the acceleration having a vector component of specific polarity parallel to the respective first axis. Each respective one of the multiple piezoelectric sensors is electrically connected in a respective one of multiple current paths that are electrically connected in parallel between the first input and signal-ground. Each respective one of the multiple piezoelectric sensors has the respective first electrode electrically connected to the first input.

Consider the parallel arrangement of a number of N current paths, N being an integer larger than unity, wherein each respective one of the current paths accommodates one respective piezoelectric sensor. The resistance value of the bias resistor can then be reduced by a factor of N, as a result of which the thermal noise can be decreased by a factor of N with respect to the thermal noise in the configuration using only a single piezoelectric sensor in the accelerometer, while maintaining the same cut-off frequency level. Examples of apparatus according to the invention will be discussed further below.

In a further embodiment of the apparatus in the invention, at least one of the multiple current paths comprises at a further piezoelectric sensor. The electrical configuration of input network of the accelerometer is such that the voltages, produced by the multiple piezoelectric sensors, are summed at the input of the amplifier, regardless of whether or not each of the parallel current paths comprises one or more piezoelectric sensors. The series arrangement of the piezoelectric sensors in a particular current path enables to use a fractional adjustment of the thermal noise effects. For example, consider a number of M parallel current paths, each comprising a series arrangement of K identical piezoelectric sensors, wherein M and K are positive integers. In order to maintain the cut-off frequency, the resistance value of the bias resistor would then change by a factor of K/M and the thermal noise voltage would change by a factor of (K/M). In order to have a reduction of the thermal noise voltage, the number K is to be smaller than the number M.

In a further embodiment of the apparatus in the invention, a first one of the multiple piezoelectric sensors has a first subsidiary axis of subsidiary sensitivity to the acceleration. The first subsidiary axis is oriented differently from the main axis of main sensitivity of the first piezoelectric sensor. A second one of the multiple piezoelectric sensors has a second subsidiary axis of subsidiary sensitivity. The second subsidiary axis is oriented differently from the main axis of main sensitivity of the second piezoelectric sensor. The first piezoelectric sensor and the second piezoelectric sensor are mounted so that: the first piezoelectric sensor generates a first further voltage between the first electrode of the first piezoelectric sensor and the second electrode of the first piezoelectric sensor in response to a further vector component of the acceleration parallel to the first subsidiary axis of the first piezoelectric sensor; the second piezoelectric sensor generates a second further voltage between the first electrode of the second piezoelectric sensor and the second electrode of the second piezoelectric sensor in response to the further vector component of the acceleration; and the first further voltage and the second further voltage have opposite polarity.

This further embodiment is relevant in view of the following. Each of the piezoelectric sensors accommodated in the accelerometer may generate a spurious signal in response to a further vector component of the acceleration in a direction not parallel to the main axis of sensitivity of the piezoelectric sensor. Remember that the piezoelectric sensors are substantially identical, that the piezoelectric sensors have their main axes all aligned, and that the piezoelectric sensors are mounted so that they all generate a voltage of the same polarity at their first electrode in response to the vector component of the acceleration that is parallel to the main axes. Consider now organizing the piezoelectric sensors in pairs, and consider a specific pair consisting of a first piezoelectric sensor and a second piezoelectric sensor. The first piezoelectric sensor is mounted in an orientation so as to have the first piezoelectric sensor generate a first further voltage of particular polarity at its first electrode in response to the acceleration having the further vector component aligned with the first subsidiary axis of the first piezoelectric sensor. If the second piezoelectric sensor is mounted in an orientation so as to have the second piezoelectric sensor generate a second further voltage at its first electrode of a polarity opposite to the particular polarity of the first further voltage, the spurious signals of the first and second piezoelectric sensors substantially cancel each other out.

Consider an embodiment wherein the subsidiary axis of sensitivity of each specific one of the first piezoelectric sensor and second piezoelectric sensor is oriented substantially perpendicularly with respect to the main axis of sensitivity of the specific piezoelectric sensor. Then, mounting the first piezoelectric sensor and the second piezoelectric sensor so as to have their subsidiary axes aligned but pointing into opposite directions, results in cancelling out of the contributions to the voltage at the input of the amplifier that are caused by the further vector component of the acceleration.

The spurious signals produced by the piezoelectric sensors are cancelled if the piezoelectric sensors are oriented pairwise in the way described above. This applies to any pair of piezoelectric sensors whether they are mounted in different ones of the parallel current paths or in the same current path.

The invention also relates to an accelerometer suitable for use in the apparatus as specified above.

The invention also relates to a physical component configured for use in an apparatus as specified above, and configured for being subjected to acceleration in operational use of the apparatus, wherein the physical component comprises an accelerometer configured for supplying a signal representative of the acceleration. Examples of the physical component are discussed further below. The accelerometer may be physically integrated or otherwise combined with the physical component. The combination may then be marketed as a separate entity, e.g., as an after-market add-on or an upgrade to an existing apparatus so as to enable measuring the acceleration of the physical component, as a spare part of an existing apparatus, or as a module for a manufacturer of an apparatus.

The invention also relates to a method of manufacturing an accelerometer. The accelerometer is configured for supplying a signal representative of an acceleration. The accelerometer comprises an electronic circuit with a voltage amplifier, having an input and an output; multiple piezoelectric sensors that are substantially identical; and a bias resistor, connected between the input and signal-ground. Each respective one of the multiple piezoelectric sensors has a respective first electrode, a respective second electrode, and a respective main axis of main sensitivity. The method comprises: selecting a desired cut-off frequency; determining an acceptable power density level at the input indicative of thermal noise of the bias resistor; determining a number of the multiple piezoelectric sensors in dependence on the desired cut-off frequency and the acceptable power density; mounting each respective one of the multiple piezoelectric sensors for generating a respective positive voltage at the respective first electrode and a respective negative voltage at the respective second electrode in response to the acceleration having a vector component of specific polarity parallel to the respective main axis; mounting the multiple piezoelectric sensors with their main axes of main sensitivity aligned with each other; and electrically connecting each respective one of the multiple piezoelectric sensors in a respective one of multiple current paths that are electrically connected in parallel between the input and signal-ground; and electrically connecting the respective first electrode of each respective one of the multiple piezoelectric sensors to the input.

An embodiment of the method of the invention comprises electrically connecting at least a further piezoelectric sensor in at least one of the multiple current paths.

In a further embodiment of the method in the invention a first one of the multiple piezoelectric sensors has a first subsidiary axis of subsidiary sensitivity to the acceleration. The first subsidiary axis is oriented differently from the main axis of main sensitivity of the first piezoelectric sensor. A second one of the multiple piezoelectric sensors has a second subsidiary axis of subsidiary sensitivity. The second subsidiary axis is oriented differently from the main axis of main sensitivity of the second piezoelectric sensor. The method comprises mounting the first piezoelectric sensor and the second piezoelectric sensor so that: the first piezoelectric sensor generates a first further voltage between the first electrode of the first piezoelectric sensor and the second electrode of the first piezoelectric sensor in response to a further vector component of the acceleration parallel to the first subsidiary axis of the first piezoelectric sensor; the second piezoelectric sensor generates a second further voltage between the first electrode of the second piezoelectric sensor and the second electrode of the second piezoelectric sensor in response to the further vector component of the acceleration; and the first further voltage and the second further voltage have opposite polarity.

BRIEF DESCRIPTION OF THE DRAWINGS

The invention is explained in further detail, by way of example and with reference to the accompanying drawings, wherein.

Throughout the Figures, similar or corresponding features are indicated by same reference numerals.

DETAILED EMBODIMENTS

The invention relates to an apparatus comprising a physical component and an accelerometer. The physical component is subjected to acceleration in operational use of the apparatus. The accelerometer is configured for supplying a signal representative of the acceleration.

For example, the apparatus is a machine, e.g., stationary industrial equipment, a construction such as a bridge or a building, a vehicle such as an automobile, a railroad car, construction equipment such as a crane or a dump truck, agriculture equipment such as a tractor or a combine harvester, etc. The physical component comprises, e.g., a rolling-elements bearing, a wheel or a shaft, a part of the suspension of the wheel or the shaft, a chassis of a vehicle, a beam of a bridge or of a building, etc. The signal from the accelerometer can be used for condition monitoring of the physical component of the machine, e.g., in case proper operation of the physical component is critical to the operation of the machine. For example, the accelerometer is used to measure vibrations of a rolling-element bearing in a machine, or vibrations of a beam in a bridge carrying a railroad or a motorway. Alternatively, the accelerometer can be an integral functional part of an automated control system. Such a control system controls operational use of the machine in dependence on the acceleration, to which the physical component is subjected. For example, the accelerometer is a functional part of an active suspension system, of an anti-lock braking system or of a traction control system of an automobile. The accelerometer measures the accelerations of a shaft, of a wheel or of another part of the suspension of the automobile. Alternatively, the apparatus is a hand-held video game controller forming part of a human-machine interface to a data processing system. The video game controller enables the user to control the video game based on moving the controller.

Figure 1:
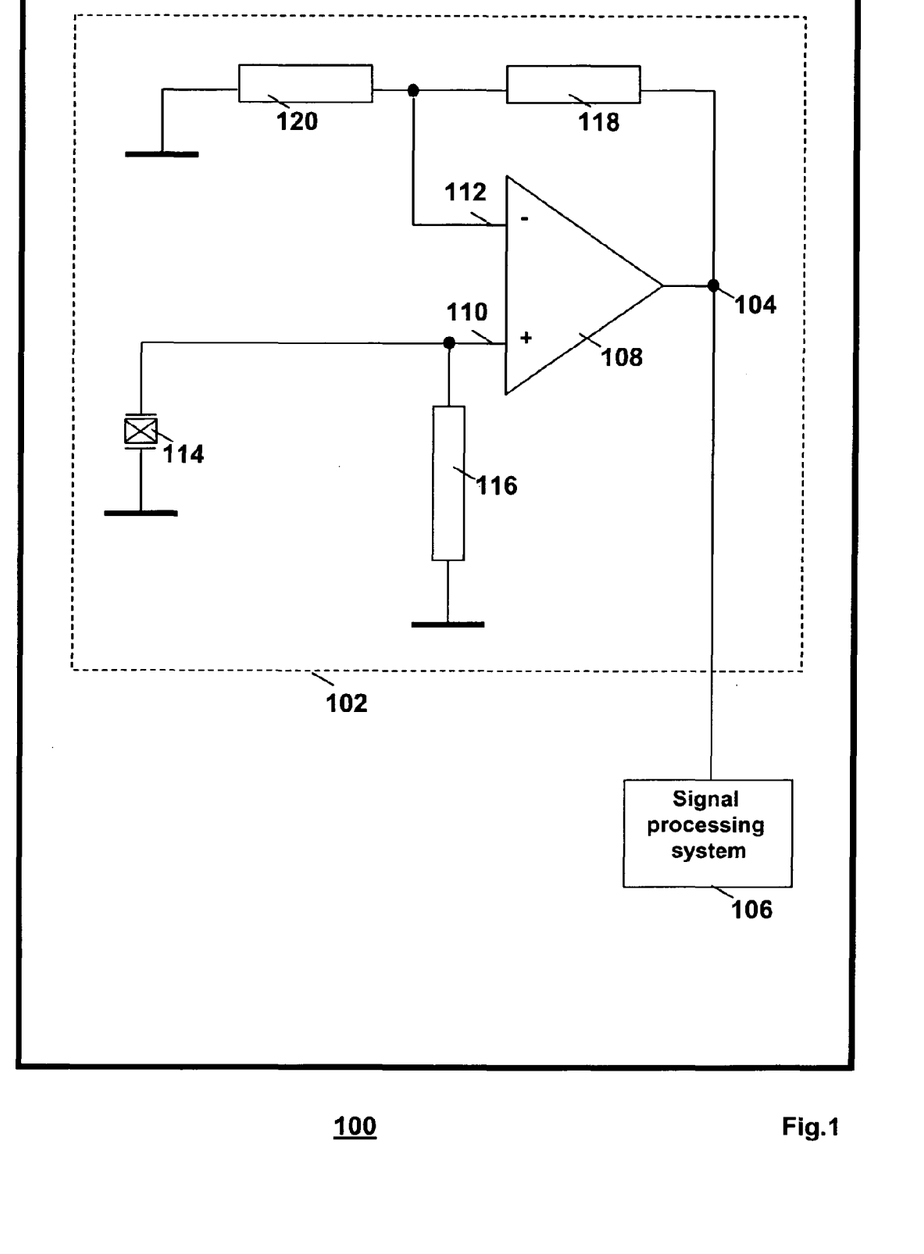
FIG. 1 is a block diagram of a known embodiment of an apparatus.

FIG. 1 is a diagram of a known embodiment 100 of an apparatus. The known embodiment 100 comprises an accelerometer 102 for sensing an acceleration or deceleration of a physical component (not shown) of the known embodiment 100. The accelerometer 102 is operative to supply an output signal at an output 104 of the accelerometer 102. The output signal is representative of an acceleration of the physical component or deceleration of the physical component, sensed by the accelerometer 102. The output 104 of the accelerometer 102 is connected to a signal processing system 106. The signal processing system 106 is operative to process the output signal. For example, the signal processing system maintains a history of accelerations and decelerations sensed by the accelerometer 102 in operational use of the known embodiment 100. Then, data representative of the output signal is stored in a memory (not shown). Alternatively, the signal processing system 106 is operative to, e.g., transmit a radio signal to an external receiver (not shown), wherein the radio signal is representative of the output signal received from the output 104. The receiver may then keep a history log of the accelerations and/or decelerations sensed by the accelerometer 102 in operational use of the known embodiment 100, or may trigger an action by controlling an actuator (not shown) in dependence on the output signal Alternatively, the signal processing system 106 is operative to, e.g., process the received output signal under control of software in order to control an actuator (not shown).

The accelerometer 102 comprises an amplifier 108. In the example shown, the amplifier 108 comprises a differential voltage amplifier that amplifies a difference between a first voltage at a first input 110 and a second voltage at a second input 112, and that supplies the amplified difference as the output signal at the output 104.

The first input 110 is connected to signal-ground via a first piezoelectric sensor 114. The first input 110 is also connected to signal-ground via a bias resistor 116. The second input 112 is connected to the output 104 via a first resistor 118, and to signal-ground via a second resistor 116. The first resistor 112 and the second resistor 124 form a resistive network between the output 104 and signal-ground, providing feedback from the output 104 to the second input 112.

Note that the voltage amplifier 108 is connected in an amplifier-configuration that is known as a "non-inverting amplifier". The input impedance of such a non-inverting amplifier can be considered as infinite for all practical purposes. The non-inverting amplifier configuration is well suited for the purpose of amplifying a signal received from a high-impedance source, as the non-inverting amplifier does not draw any current at its input, here the first input 110. Any current drawn by the non-inverting amplifier at its input would affect the accuracy of the signal to be amplified.

Figure 2:
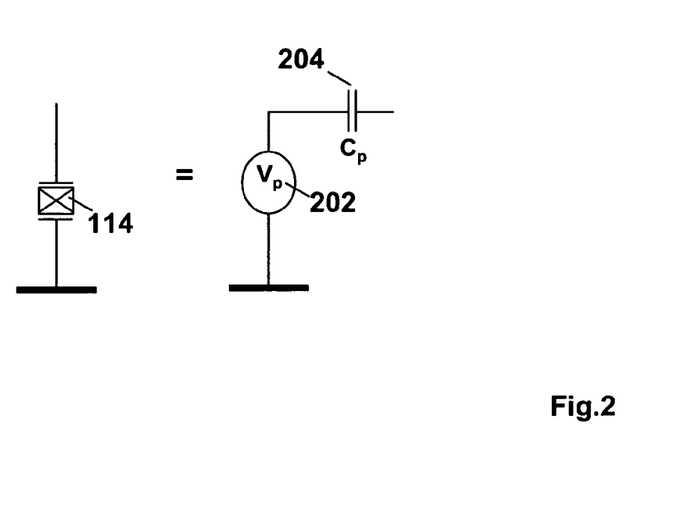
FIG. 2 is a diagram of an electrical circuit for modelling a piezoelectric sensor.

Reference is now made to FIG. 2. FIG. 2 is a diagram of an electrical circuit for modelling the piezoelectric sensor 114. As known, the first piezoelectric sensor 114 is operative to sense a rate of change in velocity using the piezoelectric effect of certain materials such as quartz, barium titanate ($BaTiO_3$), and lead zirconate titanate (PZT). The first piezoelectric sensor 114 can be modelled as a voltage source 202 in series with a capacitance 204 of magnitude $C_p$. The voltage supplied by the voltage source 202 is representative of the sensed rate of change of the velocity. The low-frequency limit of the flat part of the frequency-response characteristic of the accelerometer 102 is determined by the value $C_p$ of the capacitance 204 and a resistance value $R_b$ of the bias resistor 116, if the bias resistor 116 were an ideal resistor. The cut-off frequency (or: the low-frequency limit, or: the 3 dB cut-off frequency) has a magnitude equal to $1/(2\pi C_p R_b)$.

The bias resistor 116 is not an ideal resistor. For example, the resistance value of the bias resistor 116 depends in practice on the temperature of the bias resistor 116. It is assumed that the temperature of the bias resistor 116 can be considered as substantially uniform throughout the bias resistor 116, so that one can indeed speak of the temperature of the bias resistor 116. The electrons giving rise to the flow of the electric current through the bias resistor 116 are subjected to thermal agitation. The electronic noise produced by the thermal agitation of the electrons is referred to as "Johnson noise" or "Johnson-Nyquist noise". The spectral density of the power of the thermal noise (i.e., the power per Hertz of bandwidth of the thermal noise or: the mean square value of the voltage per Hertz of bandwidth) is given by the expression $4 k_B T R_b$. Herein, $k_B$ stands for Boltzmann's constant, T stands for the temperature (in Kelvin), and $R_b$ stands for the resistance value in Ohms of the bias resistor 116 if the bias resistor 116 were ideal For a given frequency bandwidth $\Delta f$, wherein one wants to consider the electrical effects of the thermal noise, the actual bias resistor 116 can be modelled as a series arrangement of a noise voltage source that supplies a mean noise voltage equal to the square root of $4 k_B T R_b \Delta f$, and an ideal bias resistor 116 having the resistance value $R_b$.

In order to reduce the thermal noise effects owing to the presence of the bias resistor 116, one could lower the resistance value $R_b$. However, lowering the resistance value $R_b$ has the undesired effect that the cut-off frequency, given by the expression $1/(2\pi C_p R_b)$, is increased.

Figure 3:
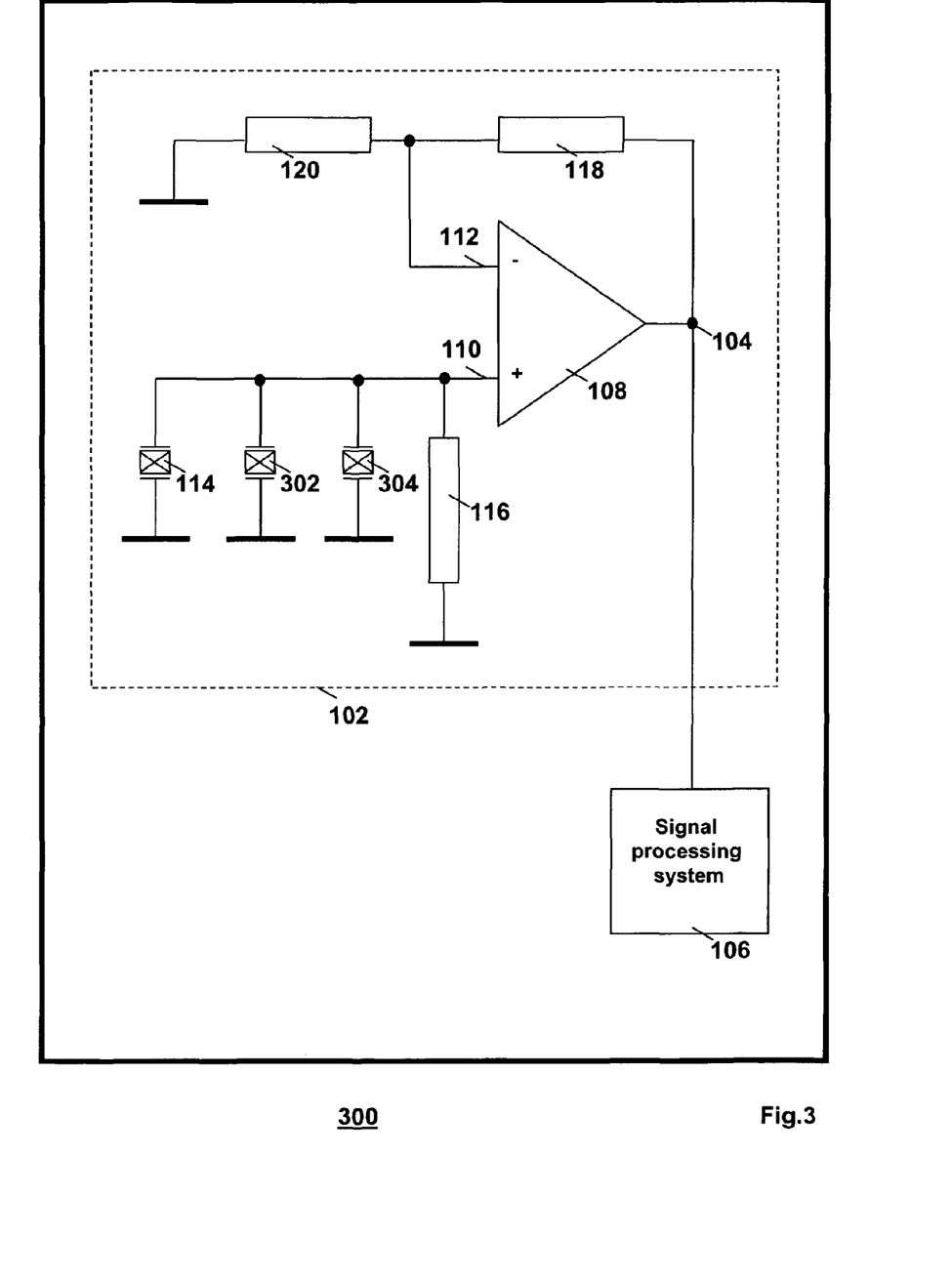
FIG. 3 is a block diagram of a first embodiment of an apparatus in the invention.

Reference is now made to FIG. 3. FIG. 3 is a diagram of a first embodiment 300 of an apparatus in the invention, whose configuration differs from that of the known embodiment 100 of the apparatus in FIG. 1. The first embodiment 300 comprises multiple piezoelectric sensors in the accelerometer 102. The multiple piezoelectric sensors are electrically connected in parallel. More specifically, the first embodiment 300 comprises the first piezoelectric sensor 114 and also, for example, a second piezoelectric sensor 302 and a third piezoelectric sensor 304. The first piezoelectric sensor 114, the second piezoelectric sensor 302 and the third piezoelectric sensor 304 are mounted such that an acceleration or deceleration of the physical object of the first embodiment 300 exercises a stress or pressure on the first piezoelectric sensor 114, the second piezoelectric sensor 302 and the third piezoelectric sensor 304. As a result, the first piezoelectric sensor 114, the second piezoelectric sensor 302 and the third piezoelectric sensor 304 undergo deformations that cause a respective electric field to develop across the piezoelectric material of each respective one of the first piezoelectric sensor 114, the second piezoelectric sensor 302 and the third piezoelectric sensor 304. The electric fields, in turn, give rise to an electric current via the bias resistor 116 as a result of which a voltage is generated at the first input 110.

The following assumptions are made. The first piezoelectric sensor 114, the second piezoelectric sensor 302 and the third piezoelectric sensor 304 are substantially identical with regard to their electrical behaviour. Also, the first piezoelectric sensor 114, the second piezoelectric sensor 302 and the third piezoelectric sensor 304 have been mounted close together so as to be subjected to the substantially the same rate of change of velocity of the physical objects in operational use of the first embodiment 300. Furthermore, the first piezoelectric sensor 114, the second piezoelectric sensor 302 and the third piezoelectric sensor 304 have been mounted so as to have their main orientations, i.e., the directions of their main sensitivity, spatially arranged substantially in parallel. That is, the first piezoelectric sensor 114, the second piezoelectric sensor 302 and the third piezoelectric sensor 304 are mounted so as to give rise to substantially identical currents through the bias resistor 116 in response to the acceleration or deceleration experienced by the accelerometer 102.

The qualifier "substantially" is being used in above expressions "substantially identical", "substantially the same" and "substantially in parallel". The qualifier "substantially" intends to convey the meaning, that small deviations are acceptable, but that for all practical purposes considered within the context of the invention, the first piezoelectric sensor 114, the second piezoelectric sensor 302 and the third piezoelectric sensor 304 are considered as having the same configuration, experience the same accelerations and decelerations, and have their main orientations pointing in the same direction.

Now, a consequence of having the first piezoelectric sensor 114, the second piezoelectric sensor 302 and the third piezoelectric sensor 304 electrically arranged in parallel, is that the capacitance at the first input 110 assumes the value $3 C_p$. If the resistance value $R_b$ of the bias resistor 116 is now reduced by a factor of 3, the cut-off frequency remains the same and the thermal noise of the bias resistor 116 is reduced by a factor equal to 3.

FIG. 3 illustrates the first embodiment 300 with the first piezoelectric sensor 114, the second piezoelectric sensor 302 and the third piezoelectric sensor 304 electrically arranged in parallel. What has been illustrated in FIG. 3 with reference to three piezoelectric sensors arranged in parallel, applies to any practical number N of piezoelectric sensors arranged in parallel. The number of N may be limited by, e.g., an acceptable maximum distance between any pair of piezoelectric sensors in view of the requirement that the piezoelectric sensors be subjected to substantially the same accelerations or decelerations in operational use. Accordingly, if a number of N piezoelectric sensors are electrically connected in parallel between the first input 110 and signal-ground, the resistance value $R_b$ of the bias resistor 116 can be reduced by a factor of N, thereby maintaining the cut-off frequency as discussed with reference to the first embodiment 100 that has only a single piezoelectric sensor onboard, and reducing the thermal noise voltage by a factor of N with respect to the thermal noise level in the first embodiment 100.

Figure 4:
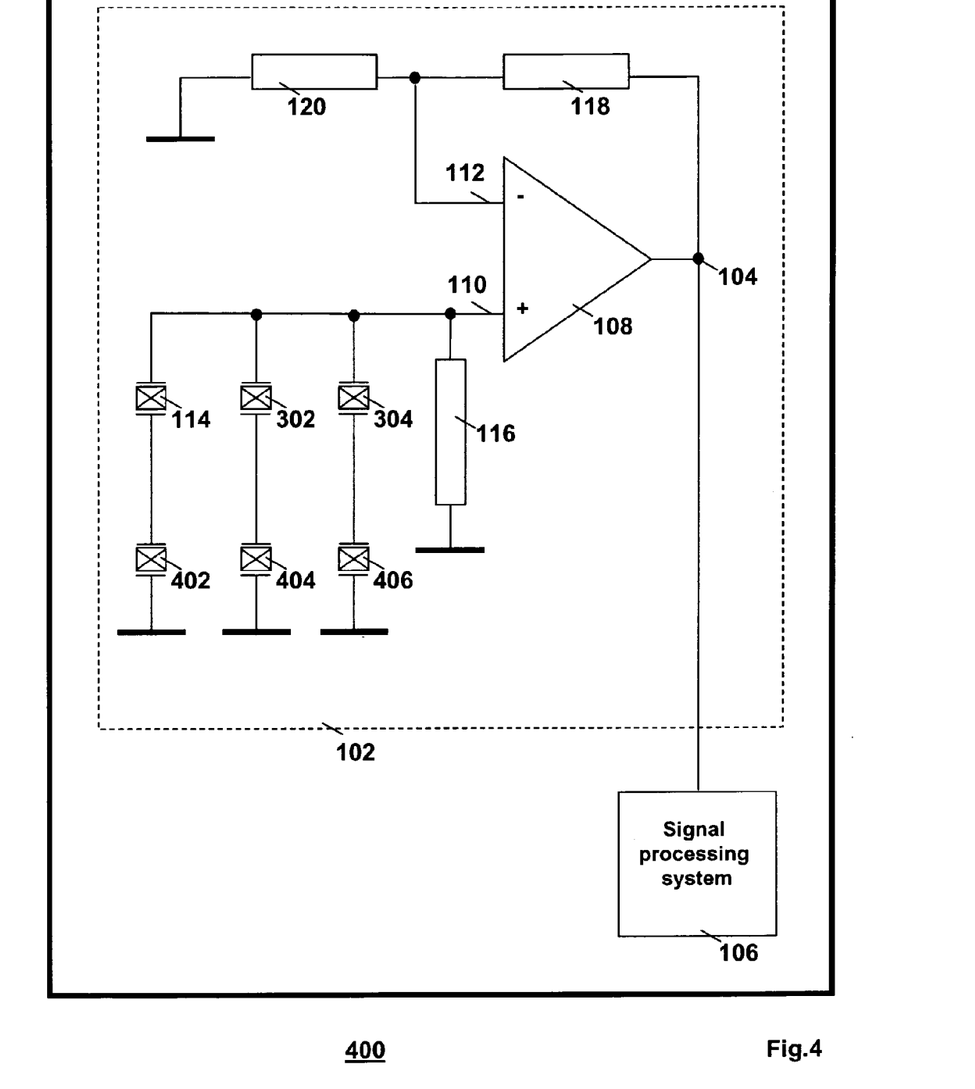
FIG. 4 is a block diagram of a second embodiment of an apparatus in the invention.

Reference is now made to FIG. 4, with a block diagram of a second embodiment 400 of the apparatus in the invention. The second embodiment 400 differs from the first embodiment 300 in that the first input 110 is connected to signal-ground via a first path, a second path and a third path that are electrically arranged in parallel. The first path comprises a series arrangement of the first piezoelectric sensor 114 and a fourth piezoelectric sensor 402. The second path comprises a series arrangement of the second piezoelectric sensor 302 and a fifth piezoelectric sensor 404. The third path comprises the third piezoelectric sensor 304 and a sixth piezoelectric sensor 406. The same assumptions apply as stated above with regard to the first embodiment 300. That is, the first piezoelectric sensor 114, the second piezoelectric sensor 302, the third piezoelectric sensor 304, the fourth piezoelectric sensor 402, the fifth piezoelectric sensor 404 and the sixth piezoelectric sensor 406 have substantially the same configuration, experience substantially the same accelerations and decelerations, and have their main orientations pointing in substantially the same direction. The capacitance at the first input now has a value of $\frac{1}{2} C$. The bias resistor 116 can now be given a resistance value of $\frac{2}{3} R_b$ in order to maintain the cut-off frequency and in order to reduce the thermal noise voltage by a factor of ($\frac{2}{3}$). Similarly, if a number of M parallel paths were used, each comprising a series arrangement of K identical piezoelectric sensors, the capacitance value at the first input 110 would be M/K C.sub.p. In order to maintain the cut-off frequency of the known embodiment 100, the resistance value of the bias resistor 116 would then become K/M R.sub.b and the thermal noise voltage would change by a factor of (K/M). In order to have a reduction of the thermal noise voltage, the number K is to be smaller than the number M.

As explained above, the accelerometer 102 is configured to measure the acceleration or deceleration of the physical component in a specific direction. For this reason, the first piezoelectric sensor 114, the second piezoelectric sensor 302 and the third piezoelectric sensor 304 in the first embodiment 300 are oriented in such a manner that their respective directions of main sensitivity to acceleration or deceleration are aligned with the specific direction. Similarly, the first piezoelectric sensor 114, the second piezoelectric sensor 302, the third piezoelectric sensor 304, the fourth piezoelectric sensor 402, the fifth piezoelectric sensor 404 and the sixth piezoelectric sensor 406 in the second embodiment 400 have aligned their respective directions of main sensitivity to the specific direction of the acceleration or deceleration. However, each respective one of the first piezoelectric sensor 114, the second piezoelectric sensor 302, the third piezoelectric sensor 304, the fourth piezoelectric sensor 402, the fifth piezoelectric sensor 404 and the sixth piezoelectric sensor 406 is also sensitive to accelerations or decelerations in directions, other than the specific direction. It is desirable to suppress the spurious responses of the first piezoelectric sensor 114, the second piezoelectric sensor 302, the third piezoelectric sensor 304, the fourth piezoelectric sensor 402, the fifth piezoelectric sensor 404 and the sixth piezoelectric sensor 406 to accelerations or decelerations of the accelerometer 102 in these other directions.

Figure 5:
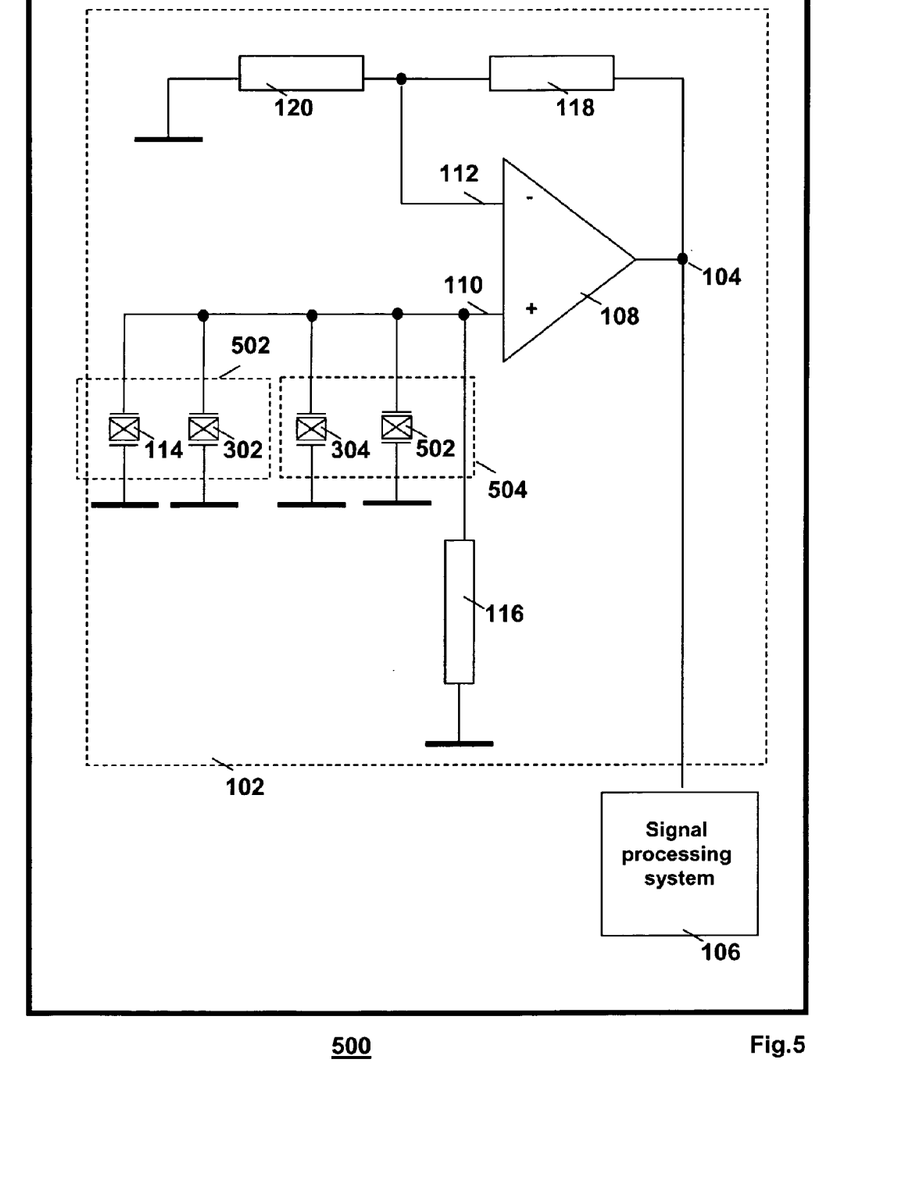
FIG. 5 is a block diagram of a third embodiment of an apparatus in the invention.

Reference is now made to FIG. 5 of a block diagram of a third embodiment 500 of the apparatus in the invention. The accelerometer 102 now comprises a parallel arrangement of an even number of piezoelectric sensors: the first piezoelectric sensor 114, the second piezoelectric sensor 302, the third piezoelectric sensor 304, and a seventh piezoelectric sensor 502. As in the first embodiment 300 and in the second embodiment 400, the first piezoelectric sensor 114, the second piezoelectric sensor 302, the third piezoelectric sensor 304, and a seventh piezoelectric sensor 502 are substantially of identical configuration and have their direction of main sensitivity to accelerations or decelerations aligned with one another. The even number of piezoelectric sensors can be organized in pairs. For example, the first piezoelectric sensor 114 and the second piezoelectric sensor 302 form a first pair 504. The third piezoelectric sensor 304 and the seventh piezoelectric sensor 502 form a second pair 506. Now, the piezoelectric sensors per individual one of the first pair 504 and second pair 506 are mounted in such a manner that they generate responses of opposite polarity when the accelerometer 102 is subjected to an acceleration or deceleration in a direction other than the specific direction of their main sensitivity. In order to explain this, reference is had to FIGS. 6, 7, 8, 9, 10 and 11.

Reference is now made to the diagrams of FIGS. 6, 7, 8, 9 10 and 11. The diagrams of FIGS. 6-11 illustrate the dependence of the voltage produced by a reference piezoelectric sensor 600 in dependence on an orientation of the acceleration with respect to the reference piezoelectric sensor 600. As known, the acceleration is represented as a vector having magnitude and a direction. The direction of the acceleration vector is specified with respect to a first axis 602, a second axis 604 and a third axis 606 that together span a three-dimensional space. Note the directionality of the first axis 602, of the second axis 604 and of the third axis 606. The directionality of a specific one of the first axis 602, the second axis 604 and the third axis 606 enables to specify whether the polarity of a vector component along the specific axis is positive or negative. Assume that the main axis of sensitivity of the reference piezoelectric sensor 600 is the second axis 604.

Figure 6:
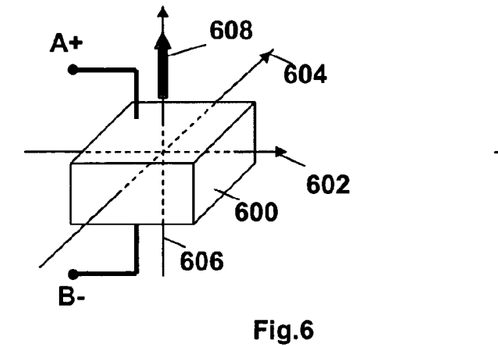
FIGS. 6, 7, 8, 9, 10 and 11 are diagrams illustrating a polarity of a voltage produced by a piezoelectric sensor in dependence on an orientation of the acceleration.

In FIG. 6, the acceleration is represented by a vector 608 pointing upwards along the third axis 606. A first potential of a first terminal A of the reference piezoelectric sensor 600 is then positive and a second potential of a second terminal B is then negative. For convenience, the resulting voltage between the first terminal A and the second terminal B is defined as the scalar resulting when subtracting the second potential from the first potential. The resulting voltage in the scenario of FIG. 6 is positive.

Figure 7:
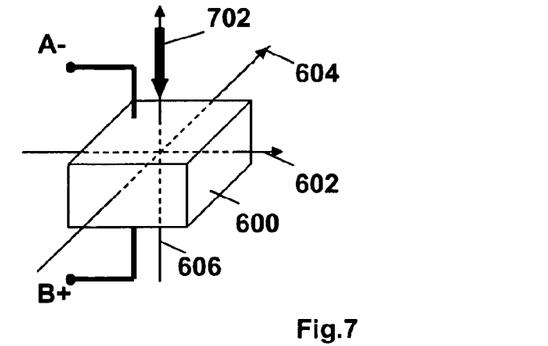

In FIG. 7, the acceleration is represented by a vector 702 pointing downwards along the third axis 606. The first potential of the first terminal A of the reference piezoelectric sensor 600 is then negative and the second potential of the second terminal B is then positive. The resulting voltage in the scenario of FIG. 7 is then negative.

Figure 8:
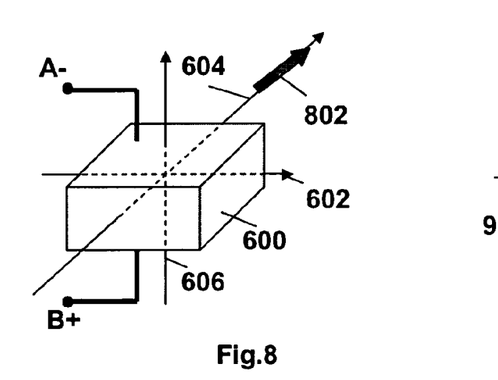

In FIG. 8, the acceleration is represented by a vector 802 pointing along the second axis 604 and away from the viewer. The first potential of the first terminal A of the reference piezoelectric sensor 600 is then negative and the second potential of the second terminal B is then positive. The resulting voltage in the scenario of FIG. 8 is then negative.

Figure 9:
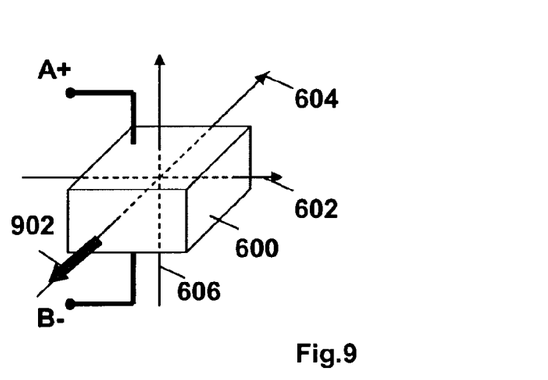

In FIG. 9, the acceleration is represented by a vector 902 pointing along the second axis 604 and towards the viewer. The first potential of the first terminal A of the reference piezoelectric sensor 600 is then positive and the second potential of the second terminal B is then negative. The resulting voltage in the scenario of FIG. 9 is then positive.

Figures 10, 11:
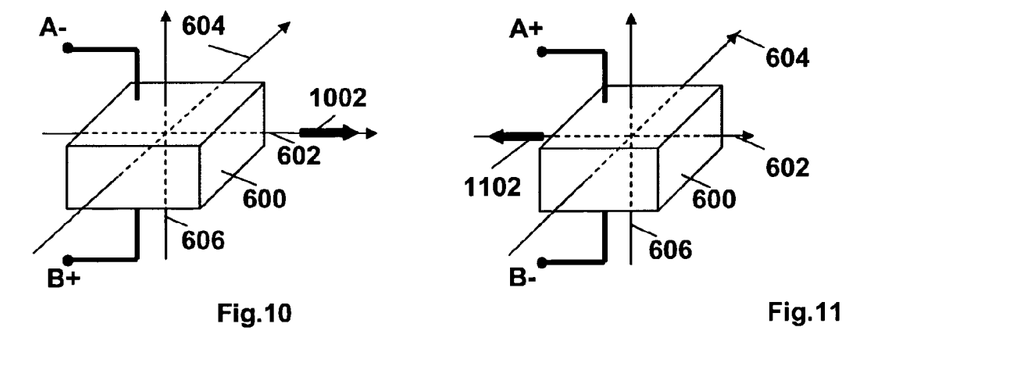

In FIG. 10, the acceleration is represented by a vector 1002 pointing along the first axis 602 and to the right. The first potential of the first terminal A of the reference piezoelectric sensor 600 is then negative and the second potential of the second terminal B is then positive. The resulting voltage in the scenario of FIG. 10 is then negative.

In FIG. 11, the acceleration is represented by a vector 1102 pointing along the first axis 602 and to the left. The first potential of the first terminal A of the reference piezoelectric sensor 600 is then positive and the second potential of the second terminal B is then negative. The resulting voltage in the scenario of FIG. 11 is then positive.

With reference to FIGS. 5, 8-11, consider now the first pair 504 formed by the first piezoelectric sensor 114 and the second piezoelectric sensor 302 in the third embodiment 500. The first piezoelectric sensor 114 and the second piezoelectric sensor 302 are practically identical. Assume that the behaviour of each of the first piezoelectric sensor 114 and the second piezoelectric sensor 302 is identical to that of the reference piezoelectric sensor 600, as discussed with reference to FIGS. 6-11 for the reference piezoelectric sensor 600. Assume further that the behaviour of each of the first piezoelectric sensor 114 and the second piezoelectric sensor 302 is anti-symmetrical. That is, each of the first piezoelectric sensor 114 and the second piezoelectric sensor 302 produces a first voltage of certain magnitude and certain polarity when subjected to acceleration of certain magnitude and in a certain direction, and produces a second voltage of the same magnitude but of opposite polarity when subjected to acceleration of the same magnitude in the opposite direction. Assume further that the first piezoelectric sensor 114 and the second piezoelectric sensor 302 are mounted, e.g., on a PCB, close to each other and with their main axes of sensitivity in parallel. Assume also that the main axis of the first piezoelectric sensor 114 and the main axis of the second piezoelectric sensor 302 each correspond to the second axis 604 of the reference piezoelectric sensor 600 in FIG. 6. Assume further that accelerations along the first axis 602 are considered not relevant to the operation of the accelerometer 102 and give rise to spurious voltages between the first terminal A and the second terminal B.

Consider now a scenario wherein the first piezoelectric sensor 114 and the second piezoelectric sensor 302 are mounted with their respective first axes 602, respective second axes 604 and respective third axes 606 in the same respective orientations and directionalities. That is: the orientation and directionality of the first axis 602 of the first piezoelectric sensor 114 are the same as the orientation and directionality of the first axis 602 of the second piezoelectric sensor 302; the orientation and directionality of the second axis 604 of the first piezoelectric sensor 114 are the same as the orientation and directionality of the second axis 604 of the second piezoelectric sensor 302; and the orientation and directionality of the third axis 606 of the first piezoelectric sensor 114 are the same as the orientation and directionality of the third axis 606 of the second piezoelectric sensor 302. When subjected to an acceleration having a vector component along the first axis 602 of the first piezoelectric sensor 114 and, therefore, having the same vector component along the first axis of the second piezoelectric sensor 302, the first piezoelectric sensor 114 and the second piezoelectric sensor 302 produce the same voltages between their respective first electrodes A and their respective second electrodes B. The first electrode A of the first piezoelectric sensor 114 and the first electrode A of the second piezoelectric sensor 302 are then connected to each other in the accelerometer 102. Likewise, the second electrode B of the first piezoelectric sensor 114 and the second electrode B of the second piezoelectric sensor 302 are connected to each other in the accelerometer 102. As a result, the first piezoelectric sensor 114 and the second piezoelectric sensor 302 produce spurious voltages in response to acceleration with a vector component along the first axis 602. The spurious voltages have the same polarity and add up at the first input 110 of the amplifier 108 and will be amplified.

Now, imagine a scenario, wherein the first piezoelectric sensor 114 and the second piezoelectric sensor 302 are mounted on the PCB so as to have been rotated over 180 .degree. around the second axis 604 with respect to one another. The rotation causes the directionality of the first axis of the first piezoelectric sensor 114 and the directionality of the second piezoelectric sensor 302 to be opposite to one another. As a consequence, the first piezoelectric sensor 114 and the second piezoelectric sensor 302 produce spurious voltages of opposite polarity, in response to acceleration with a vector component along the first axis 602.

Accordingly, the spurious voltages produces by the first piezoelectric sensor 114 and the second piezoelectric sensor 302 cancel each other out at the first input 110 of the amplifier 108. Similar considerations apply to the mounting of the third piezoelectric sensor 304 and the seventh piezoelectric sensor 502 in the third embodiment 500 of FIG. 5. Likewise, similar considerations apply to any accelerometer 102 comprising a plurality of parallel paths between the first input 110 of the amplifier 108, wherein each respective path comprises a respective single piezoelectric sensor or a respective series arrangement of two or more piezoelectric sensors.

Examples of piezoelectric sensors are the shock sensor PKGS-25NB-R and the shock sensor PKGS-90-LD, manufactured by Murata Manufacturing Co., Ltd. The PKGS-25NB-R and PKGS-90-LD are of a reflow solderable SMD (surface mount device) type, and each has a principal axis of main sensitivity. These shock sensors of the PKGS-series are piezoelectric sensors that comprise a diaphragm (not shown) having a piezoelectric ceramic disk that forms a laminate with a metal disk and that is supported around its periphery. The piezoelectric sensor produces an electrical signal proportional to the impact or vibration to which the sensor is being subjected. The PKGS-90-LD has following electric properties: a typical sensitivity of 0.28 pCIG; a typical capacitance $C_p$ of 755 pF; a typical resonant frequency of 22 kHz. Consider as a practical example a cut-off frequency lying in the range of, e.g., 5 Hz-10 Hz. The bias resistor 116 may then have a resistance value $R_b$ of 100 MOhm if only a single piezoelectric sensor 114 is being used in the accelerometer 102, as in the known embodiment 100 of FIG. 1. The thermal noise in the frequency band of 1 Hz-100 Hz is then about 1.97 $\mu V$ (rms). When two piezoelectric sensors are being used, arranged in parallel, a resistance value $R_b$ of the bias resistor 116 can be set to 50 MOhm, and the thermal noise is reduced to about 1.40 $\mu V$ (rms). Using three piezoelectric sensors arranged in parallel, as in the first embodiment 300 of FIG. 3, a resistance value $R_b$ of the bias resistor 116 can be set to 33 MOhm, and the thermal noise is reduced to about 1.14 $\mu V$ (rms). Using four piezoelectric sensors arranged in parallel, as in the third embodiment 500 of FIG. 5, a resistance value $R_b$ of the bias resistor 116 can be set to 25 MOhm, and the thermal noise is reduced to about 0.99 $\mu V$ (rms).

The invention claimed is:

1. An apparatus comprising:
   a physical component subjected to acceleration in operational use of the apparatus; and
   an accelerometer configured for supplying a signal representative of the acceleration;
wherein
   the accelerometer comprises an electronic circuit with:
   a voltage amplifier, having a first input, a second input, and an output, the electronic circuit being free of a feedback connection between the first input and the output;
   multiple piezoelectric sensors that are substantially identical, each of the multiple piezoelectric sensors electrically connected to the first input without a switch therebetween such that constant electrical communication is maintained between the multiple piezoelectric sensors and the first input; and
   a bias resistor, connected between the first input and signal-ground;
   each respective one of the multiple piezoelectric sensors has a respective first electrode, a respective second electrode, and a respective main axis of main sensitivity;
   each respective one of the multiple piezoelectric sensors is mounted for generating a respective positive voltage at the respective first electrode and a respective negative voltage at the respective second electrode in response to the acceleration having a vector component of specific polarity parallel to the respective main axis;
   the multiple piezoelectric sensors are mounted with their main axes of main sensitivity aligned with each other;
   each respective one of the multiple piezoelectric sensors is electrically connected in a respective one of multiple current paths that are electrically connected in parallel between the first input and signal-ground; and
   each respective one of the multiple piezoelectric sensors has the respective first electrode electrically connected to the first input.

2. The apparatus of claim 1, wherein at least one of the multiple current paths comprises at least a further piezoelectric sensor.

3. The apparatus of claim 1, wherein:
- a first one of the multiple piezoelectric sensors has a first subsidiary axis of subsidiary sensitivity to the acceleration;
- the first subsidiary axis is oriented differently from the main axis of main sensitivity of the first piezoelectric sensor;
- a second one of the multiple piezoelectric sensors has a second subsidiary axis of subsidiary sensitivity;
- the second subsidiary axis is oriented differently from the main axis of main sensitivity of the second piezoelectric sensor;
- the first piezoelectric sensor and the second piezoelectric sensor are mounted so that:
- the first piezoelectric sensor generates a first further voltage between the first electrode of the first piezoelectric sensor and the second electrode of the first piezoelectric sensor in response to a further vector component of the acceleration parallel to the first subsidiary axis of the first piezoelectric sensor;
- the second piezoelectric sensor generates a second further voltage between the first electrode of the second piezoelectric sensor and the second electrode of the second piezoelectric sensor in response to the further vector component of the acceleration; and
- the first further voltage and the second further voltage have opposite polarity.

4. A physical component configured for use in an apparatus and for being subjected to acceleration in operational use of the apparatus, wherein:
- the physical component comprises an accelerometer configured for supplying a signal representative of the acceleration;
- the accelerometer comprises an electronic circuit with:
- a voltage amplifier, having a first input, a second input, and an output, the electronic circuit being free of a feedback connection between the first input and the output;
- multiple piezoelectric sensors that are substantially identical, the multiple piezoelectric sensors electrically connected to the first input without a switch therebetween such that constant electrical communication is maintained between the multiple piezoelectric sensors and the first input; and
- a bias resistor, connected between the first input and signal-ground;
- each respective one of the multiple piezoelectric sensors has a respective first electrode, a respective second electrode, and a respective main axis of main sensitivity;
- each respective one of the multiple piezoelectric sensors is mounted for generating a respective positive voltage at the respective first electrode and a respective negative voltage at the respective second electrode in response to the acceleration having a vector component of specific polarity parallel to the respective main axis;
- the multiple piezoelectric sensors are mounted with their main axes of main sensitivity aligned with each other;
- each respective one of the multiple piezoelectric sensors is electrically connected in a respective one of multiple current paths that are electrically connected in parallel between the first input and signal-ground; and
- each respective one of the multiple piezoelectric sensors has the respective first electrode electrically connected to the first input.

5. The physical component of claim 4, wherein at least one of the multiple current paths comprises at least a further piezoelectric sensor.

6. The physical component of claim 4, wherein:
- a first one of the multiple piezoelectric sensors has a first subsidiary axis of subsidiary sensitivity to the acceleration;
- the first subsidiary axis is oriented differently from the main axis of main sensitivity of the first piezoelectric sensor;
- a second one of the multiple piezoelectric sensors has a second subsidiary axis of subsidiary sensitivity;
- the second subsidiary axis is oriented differently from the main axis of main sensitivity of the second piezoelectric sensor;
- the first piezoelectric sensor and the second piezoelectric sensor are mounted so that:
- the first piezoelectric sensor generates a first further voltage between the first electrode of the first piezoelectric sensor and the second electrode of the first piezoelectric sensor in response to a further vector component of the acceleration parallel to the first subsidiary axis of the first piezoelectric sensor;
- the second piezoelectric sensor generates a second further voltage between the first electrode of the second piezoelectric sensor and the second electrode of the second piezoelectric sensor in response to the further vector component of the acceleration; and
- the first further voltage and the second further voltage have opposite polarity.

7. An accelerometer configured for supplying a signal representative of an acceleration, wherein:
- the accelerometer comprises an electronic circuit with:
- a voltage amplifier, having a first input, a second input, and an output, the electronic circuit being free of a feedback connection between the first input and the output;
- multiple piezoelectric sensors that are substantially identical, the multiple piezoelectric sensors electrically connected to the first input without a switch therebetween such that constant electrical communication is maintained between the multiple piezoelectric sensors and the first input; and
- a bias resistor, connected between the first input and signal-ground;
- each respective one of the multiple piezoelectric sensors has a respective first electrode, a respective second electrode, and a respective main axis of main sensitivity;
- each respective one of the multiple piezoelectric sensors is mounted for generating a respective positive voltage at the respective first electrode and a respective negative voltage at the respective second electrode in response to the acceleration having a vector component of specific polarity parallel to the respective main axis;
- the multiple piezoelectric sensors are mounted with their main axes of main sensitivity aligned with each other;
- each respective one of the multiple piezoelectric sensors is electrically connected in a respective one of multiple current paths that are electrically connected in parallel between the first input and signal-ground; and
- each respective one of the multiple piezoelectric sensors has the respective first electrode electrically connected to the first input.

8. The accelerometer of claim 7, wherein at least one of the multiple current paths comprises at least a further piezoelectric sensor.

9. The accelerometer of claim 7, wherein:

a first one of the multiple piezoelectric sensors has a first subsidiary axis of subsidiary sensitivity to the acceleration;

the first subsidiary axis is oriented differently from the main axis of main sensitivity of the first piezoelectric sensor;

a second one of the multiple piezoelectric sensors has a second subsidiary axis of subsidiary sensitivity;

the second subsidiary axis is oriented differently from the main axis of main sensitivity of the second piezoelectric sensor;

the first piezoelectric sensor and the second piezoelectric sensor are mounted so that:

the first piezoelectric sensor generates a first further voltage between the first electrode of the first piezoelectric sensor and the second electrode of the first piezoelectric sensor in response to a further vector component of the acceleration parallel to the first subsidiary axis of the first piezoelectric sensor;

the second piezoelectric sensor generates a second further voltage between the first electrode of the second piezoelectric sensor and the second electrode of the second piezoelectric sensor in response to the further vector component of the acceleration; and the first further voltage and the second further voltage have opposite polarity.

10. A method of manufacturing an accelerometer, wherein:

the accelerometer is configured for supplying a signal representative of an acceleration:

the accelerometer comprises an electronic circuit with:

a voltage amplifier, having a first input, a second input, and an output, the electronic circuit being free of a feedback connection between the first input and the output;

multiple piezoelectric sensors that are substantially identical, each of the multiple piezoelectric sensors electrically connected to the first input without a switch therebetween such that constant electrical communication is maintained between the multiple piezoelectric sensors and the first input; and a bias resistor, connected between the first input and signal-ground, the bias resistor connected in parallel with each of the multiple piezoelectric sensors;

each respective one of the multiple piezoelectric sensors has a respective first electrode, a respective second electrode, and a respective main axis of main sensitivity;

the method comprising:

selecting a desired cut-off frequency;

reducing thermal noise of the bias resistor with respect to a thermal noise generated by only a single piezoelectric sensor connected to the first input, without changing the desired cut-off frequency, the reduction of thermal noise further comprising the steps of:

determining a number of the multiple piezoelectric sensors in dependence on the desired cut-off frequency;

mounting each respective one of the multiple piezoelectric sensors for generating a respective positive voltage at the respective first electrode and a respective negative voltage at the respective second electrode in response to the acceleration having a vector component of specific polarity parallel to the respective main axis;

mounting the multiple piezoelectric sensors with their main axes of main sensitivity aligned with each other;

electrically connecting each respective one of the multiple piezoelectric sensors in a respective one of multiple current paths that are electrically connected in parallel between the first input and signal-ground;

electrically connecting the respective first electrode of each respective one of the multiple piezoelectric sensors to the first input; and reducing a resistance of the bias resistor by a factor equal to the number of piezoelectric sensors.

11. The method of claim 10, further comprising electrically connecting at least a further piezoelectric sensor in at least one of the multiple current paths, wherein a number of piezoelectric sensors in each of the multiple current paths is less than a number of the multiple current paths.

12. The method of claim 10, wherein:

a first one of the multiple piezoelectric sensors has a first subsidiary axis of subsidiary sensitivity to the acceleration;

the first subsidiary axis is oriented differently from the main axis of main sensitivity of the first piezoelectric sensor;

a second one of the multiple piezoelectric sensors has a second subsidiary axis of subsidiary sensitivity;

the second subsidiary axis is oriented differently from the main axis of main sensitivity of the second piezoelectric sensor;

the method comprises mounting the first piezoelectric sensor and the second piezoelectric sensor so that:

the first piezoelectric sensor generates a first further voltage between the first electrode of the first piezoelectric sensor and the second electrode of the first piezoelectric sensor in response to a further vector component of the acceleration parallel to the first subsidiary axis of the first piezoelectric sensor.

13. The method of claim 11, wherein the step of reducing the resistance of the bias resistor includes reducing the resistance of the bias resistor by a factor equal to the number of piezoelectric sensors in each of the multiple current paths divided by the number of the multiple current paths.

* * * * *